US008805025B2

(12) United States Patent
Chen et al.

(10) Patent No.: US 8,805,025 B2
(45) Date of Patent: Aug. 12, 2014

(54) STAIN DETECTION

(75) Inventors: Ping Chen, Beijing (CN); Chao He, Causeway Bay (HK); Gary Ross, Edinburgh (GB)

(73) Assignee: NCR Corporation, Duluth, GA (US)

( * ) Notice: Subject to any disclaimer, the term of this patent is extended or adjusted under 35 U.S.C. 154(b) by 204 days.

(21) Appl. No.: 13/436,078

(22) Filed: Mar. 30, 2012

(65) Prior Publication Data

US 2013/0259301 A1 Oct. 3, 2013

(51) Int. Cl.
*G06T 7/00* (2006.01)
*G07D 11/00* (2006.01)

(52) U.S. Cl.
USPC .......................................................... 382/112

(58) Field of Classification Search
None
See application file for complete search history.

(56) References Cited

U.S. PATENT DOCUMENTS 6,605,819 B2 * 8/2003 Ross ............................ 250/556
7,570,788 B2 * 8/2009 Tsukamoto et al. .......... 382/112
2004/0057629 A1 * 3/2004 Shikami et al. ............... 382/254
2004/0131242 A1 7/2004 Klevtsov
2004/0134981 A1 * 7/2004 Voser ............................ 235/379
2009/0252381 A1 * 10/2009 Nishikawa .................... 382/112
2009/0263020 A1 * 10/2009 Hamasaki et al. ............ 382/181
2009/0324053 A1 12/2009 Ross et al.
2009/0324084 A1 12/2009 Ross et al.
2011/0019881 A1 * 1/2011 Natori .......................... 382/112

OTHER PUBLICATIONS

Office Action for European Application No. 12180349.8-1953 dated Aug. 5, 2013.

* cited by examiner

*Primary Examiner* — Jon Chang
(74) *Attorney, Agent, or Firm* — Paul W. Martin

(57) ABSTRACT

A method of detecting staining on a media item is described. An example method includes receiving an image of the media item, including a plurality of pixels having different intensity values within a range of intensity values, applying central weighting to the received image, applying a threshold to each pixel in the centrally-weighted image to transform each pixel to a binary value, comparing a pixel in the evaluation image with a pixel in a binary reference image to create a difference image including (i) a stain pixel at each spatial location in which a pixel in the evaluation image has a low intensity pixel and the corresponding pixel in the binary reference image has a high intensity pixel, and (ii) a non-stain pixel at all other spatial locations. The media item is identified as stained in the event that the difference image meets a staining criterion.

14 Claims, 5 Drawing Sheets

STAIN DETECTION

FIELD OF INVENTION

The present invention relates to automated stain detection. In particular, though not exclusively, the invention relates to automated stain detection of a media item, such as a banknote, in a self-service terminal.

BACKGROUND OF INVENTION

Some self-service terminals (SSTs), such as automated teller machines (ATMs), can receive banknotes deposited by a customer. Some anti-theft systems include automatic ink staining of banknotes when a banknote cassette is withdrawn, or otherwise accessed, by an unauthorized person. Such systems cause the cassette to discharge an ink stain onto the stack of notes contained within the cassette. This ink staining on the banknotes is highly visible and is designed to alert people who may receive a stained banknote that the banknote may have been stolen.

To avoid alerting people that a banknote is stolen, criminals may deposit stained banknotes into a bank account using an ATM so that no human is present to look at the deposited banknote.

In addition, banknotes may become stained accidentally, for example, through spillage of ink, coffee, or some other liquid.

Banknote issuing authorities (such as the European Central Bank) desire to remove stained banknotes from circulation (regardless of whether those banknotes were stained as a result of theft deterrence, or accidentally stained), so it is desirable for an ATM to be able to detect stained banknotes when such banknotes are presented to ATMs.

Although it is easy for a human to identify staining on a banknote, it is much more difficult for an automated system because a banknote can be presented in four different orientations, and using a single color of visible light to image banknotes may not be sufficient to detect the staining because the stain may be the same color as the light source.

SUMMARY OF INVENTION

Accordingly, the invention generally provides methods, systems, apparatus, and software for detecting staining on a media item.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of detecting staining on a media item, the method comprising:

receiving an image of the media item, where the image comprises a plurality of pixels having different intensity values within a range of intensity values;

using pixels from the image having intensity values within a central portion of the range of intensity values to create a centrally-weighted image;

applying a threshold to each pixel in the centrally-weighted image to transform each pixel to a binary value thereby creating an evaluation image comprising a plurality of pixels, each pixel representing either high intensity or low intensity;

calculating a difference image between a binary reference image and the evaluation image by comparing a pixel in the evaluation image with a pixel in the binary reference image at a corresponding spatial location, so that the difference image includes (i) a stain pixel at each spatial location in which a pixel in the evaluation image has a low intensity pixel and the corresponding pixel in the binary reference image has a high intensity pixel, and (ii) a non-stain pixel at all other spatial locations; and indicating that the media item is stained in the event that the difference image meets a staining criterion.

The step of using pixels from the image having intensity values within a central portion of the range of intensity values to create a centrally-weighted image may comprise contrast stretching the received image to expand a central portion of the range of intensity values so that the central portion extends across almost the entire range of intensity values.

Alternatively, the step of using pixels from the image having intensity values within a central portion of the range of intensity values to create a centrally-weighted image may comprise: (i) ignoring pixels having an intensity value below a low cut-off value, and (ii) ignoring pixels having an intensity value above a high cut-off value, Whatever method is used to create a centrally-weighted image, the important point is that those pixels that have a very low intensity or a very high intensity are either (a) ignored, or (b) set to equal the lowest intensity or the highest intensity, respectively.

The method may comprise the additional step of capturing an image of the media item prior to the step of receiving an image of the media item. The step of capturing an image of the media item may further comprise capturing a transmission image of the media item. A transmission image may be captured using an electro-magnetic radiation transmitter on one side of the media item and an electro-magnetic radiation detector on the opposite side of the media item. In one embodiment, the electro-magnetic radiation used is infra-red radiation. Using infra-red radiation has the advantage that it is independent of the color of any stain on the media item.

The step of capturing an image of the media item may include using eight bits to record the intensity value for each pixel (giving a range of intensity values from 0 to 255). Alternatively, any convenient number of bits may be used, such as 16 bits, which would provide a range of intensity values between 0 and 65535).

The method may comprise the additional step of adjusting spatial dimensions of the received image so that the received image matches spatial dimensions of the binary reference image. This would compensate for any media items that have portions of an edge missing, added portions (such as adhesive tape) or have shrunk or expanded, or the like. Techniques for automatically aligning a captured image with a reference image, and then cropping or adding to the captured image to match the spatial dimensions of the reference image are well known in the art.

The step of contrast stretching the received image to expand a central portion of the range of intensity values may comprise a saturation of X percent at both low and high levels of pixel intensity values. X percent may comprise ten percent, five percent, two percent, or any other convenient value.

As those of skill in the art know, a five percent saturation at both low and high pixel intensity values means that when all of the pixels in the received image are arranged in order of pixel intensity, all pixels having a pixel intensity lower than the reference intensity (which is the five percent value from the reference being used) are all assigned to the same minimum value of pixel intensity (which may be zero), and (ii) all pixels having a pixel intensity higher than the reference intensity (which is the ninety-five percent value from the reference being used) are all assigned to the same maximum value of pixel intensity (which may be 255 if eight bits are used for each pixel intensity value). This improves image contrast (by expanding the central portion of the range of intensity values to cover the entire range available) and reduces the effects of holes and other minor anomalies in the media item or the image. The reference being used may be the pixels in the received image, or alternatively, the reference being used may be the pixels in an image from which the binary reference image was created.

The step of applying a threshold to each pixel in the centrally-weighted image may further comprise: ascertaining from a reference image from which the binary reference image was created (i) a threshold pixel intensity at which Y percent of all of the pixels in the reference image have a pixel intensity below the threshold pixel intensity, (ii) assigning a first binary value (for example, zero) to each pixel in the centrally-weighted image having a pixel intensity below or equal to the threshold pixel intensity, and (iii) assigning a second binary value (for example, one) to each pixel in the centrally-weighted image having a pixel intensity above the threshold pixel intensity. The value of Y may be twenty (percent), ten (percent), or any other convenient number. The value of Y selected may depend on characteristics of the media item (such as transmission characteristics, print colors used, reflective features, and the like). By using a threshold pixel intensity derived from the reference image, a threshold that is correct for genuine media items is used; whereas the centrally-weighted image may not be from a genuine media item (for example, the media item presented may be a counterfeit).

Alternatively, the step of applying a threshold to each pixel in the centrally-weighted image may further comprise: ascertaining from the centrally-weighted image (i) a threshold pixel intensity at which Y percent of all of the pixels in the reference image have a pixel intensity below the threshold pixel intensity, (ii) assigning a first binary value (for example, zero) to each pixel in the centrally-weighted image having a pixel intensity below or equal to the threshold pixel intensity, and (iii) assigning a second binary value (for example, one) to each pixel in the centrally-weighted image having a pixel intensity above the threshold pixel intensity.

As a further alternative, the step of applying a threshold to each pixel in the centrally-weighted image may further comprise (i) using a predefined threshold pixel intensity, (ii) assigning a first binary value (for example, zero) to each pixel in the centrally-weighted image having a pixel intensity below or equal to the predefined threshold pixel intensity, and (iii) assigning a second binary value (for example, one) to each pixel in the centrally-weighted image having a pixel intensity above the predefined threshold pixel intensity.

Prior to the step of calculating a difference image, the method may comprise the further steps of (i) comparing an orientation of the evaluation image with an orientation of the binary reference image, and (ii) where the orientations do not match, implementing a geometric transformation of the evaluation image to match the orientation of the evaluation image with the orientation of the binary reference image.

The geometric transformation may comprise rotating and/or flipping the evaluation image as required.

This reorientation step has the advantage that only one binary reference image is needed (rather than four binary reference images, one for each possible media item insertion orientation). This enables the media item to be inserted in any of the four possible orientations. In systems where a media item can be entered either long edge first or short edge first then there are eight possible orientations.

The staining criterion may comprise the difference image including contiguous stain pixels covering an area exceeding a maximum allowable stain area.

The step of indicating that the media item is stained in the event that the difference image includes contiguous stain pixels covering an area exceeding a maximum allowable stain area may include ascertaining if an area of A mm by B mm includes only stain pixels. For example, if an area of 9 mm by 9 mm includes only stain pixels then guidelines from the European Central Bank state that this should be taken as representing a stained banknote.

Alternatively, the step of indicating that the media item is stained in the event that the difference image includes contiguous stain pixels covering an area exceeding a maximum allowable stain area may include ascertaining if an area of A mm by B mm consists essentially of stain pixels. In other words, the media item may be indicated as stained despite the presence of one or two non-stain pixels in the area of A mm by B mm, where A and B are numbers (either the same number or different numbers).

The method may comprise the further step of identifying the media item.

The media item may comprise a banknote, a check, a giro, a remittance slip (each of the preceding being a financial document), or a non-financial media item (such as a label for designer goods or a certificate).

It should be appreciated that a non-stain pixel is populated in the difference image at each spatial location in which a pixel in the evaluation image has either (a) a low intensity pixel and the corresponding pixel in the binary reference image has a low intensity pixel, or (b) a high intensity pixel; and indicate that the media item is stained in the event that the difference image meets a staining criterion.

The binary reference image (and/or the final binary reference image) may be referred to as a non-stain template.

According to a second aspect there is provided a media validator operable to detect staining on a media item presented thereto, the media validator comprising:

a media item transport for transporting a media item;

an image capture device aligned with the media item transport and for capturing a two-dimensional array of pixels corresponding to the media item, each pixel having a pixel intensity relating to a property of the media item at a spatial location on the media item corresponding to that pixel; and a processor programmed to control the media transport and the image capture device, and also programmed to: receive the two-dimensional array of pixels; centrally-weight the received two-dimensional array of pixels; apply a threshold to each pixel in the centrally-weighted array of pixels to transform each pixel to a binary value thereby creating an evaluation image comprising a plurality of pixels, each having one of two possible values; calculate a difference image between a binary reference image and the evaluation image by comparing a pixel in the evaluation image with a pixel in the binary reference image at a corresponding spatial location, so that the difference image includes (i) a stain pixel at each spatial location in which a pixel in the evaluation image has a low intensity pixel and the corresponding pixel in the binary reference image has a high intensity pixel, and (ii) a non-stain pixel at all other spatial locations; and indicate that the media item is stained in the event that the difference image meets a staining criterion.

The media item transport may comprise one or more endless belts, skid plates, rollers, and the like.

The image capture device may comprise a two dimensional sensor, such as a CCD contact image sensor (CIS), that has a sensor area at least as large as the media item area. This enables an entire two-dimensional image to be captured at one point in time. Alternatively, the image capture device may comprise a linear sensor (covering one dimension of the media item, but not both dimensions) that captures a strip of the media item as the media item passes the linear sensor, so that once the entire media item has passed the linear sensor then a complete two-dimensional image of the media item can be constructed from the sequence of images captured by the linear sensor. This would enable a lower cost sensor to be used because a smaller sensing area (only as large as one dimension of the media item) would be sufficient.

The image capture device may further comprise an illumination source. The illumination source may comprise an infra-red radiation source.

The image capture device may be located on the opposite side of the media item (the opposite side of the media item path when no media item is present) to the illumination source so that a transmission image is captured. Alternatively, but less advantageously, the image capture device may be located on the same side of the media item as the illumination source so that a reflectance image is captured.

The media validator may comprise a banknote validator. The banknote validator may be incorporated into a media depository, which may be incorporated into a self-service terminal, such as an ATM.

According to a third aspect there is provided a computer program programmed to implement the steps of the first aspect.

According to a fourth aspect there is provided a method of detecting staining on a media item, the method comprising:

receiving an image of the media item, where the image comprises a plurality of pixels having different intensity values within a range of intensity values;

applying a threshold to each pixel in the received image to transform each pixel to a binary value thereby creating an evaluation image comprising a plurality of pixels, each having one of two possible values;

calculating a difference image between a binary reference image and the evaluation image; and indicating that the media item is stained in the event that the difference image meets a staining criterion.

According to a fifth aspect there is provided a method of creating a binary reference image for use in detecting staining on a media item, the method comprising:

receiving a plurality of images, each image relating to a media item of the same type and in a common orientation, and each image comprising a plurality of pixels having different intensity values within a range of intensity values, and each pixel corresponding to a spatial location on the media items;

for each spatial location, averaging the pixel values from the plurality of images to create a single pixel value at that spatial location, and thereby create a single average image having a range of intensity values;

contrast stretching the single average image to expand a central portion of the range of intensity values;

applying a threshold to each pixel in the contrast stretched image to transform each pixel to a binary value and thereby create a binary reference image comprising a plurality of pixels, each having either a high intensity or a low intensity.

The method may comprise the further step of applying a neighborhood based minimum filter to the binary reference image to create a final binary reference image.

The step of applying a neighborhood based minimum filter may comprise the steps of (i) preparing an output matrix having the same dimensions as the final binary reference image, (ii) for each pixel location $P_{ig}$ in the output matrix, examining the N×N neighborhood of the corresponding identical pixel location in the binary reference image, and obtaining the lowest intensity value from this neighborhood, then (iii) setting this lowest intensity value to $P_{ig}$ in the output matrix. This has the advantage of enlarging the dark (low intensity) areas in each N×N array in both the horizontal and vertical directions to avoid any errors introduced by printing on the media item, and the like.

Alternatively, any other convenient method for dilating the low intensity pixels may be used.

The definition of an N×N neighborhood based minimum filter is well known in the art. The N×N array may comprise a 3×3, a 4×4 array, a 2×4 array, or any other convenient array size.

According to a sixth aspect there is provided a computer program programmed to implement the steps of the fifth aspect.

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
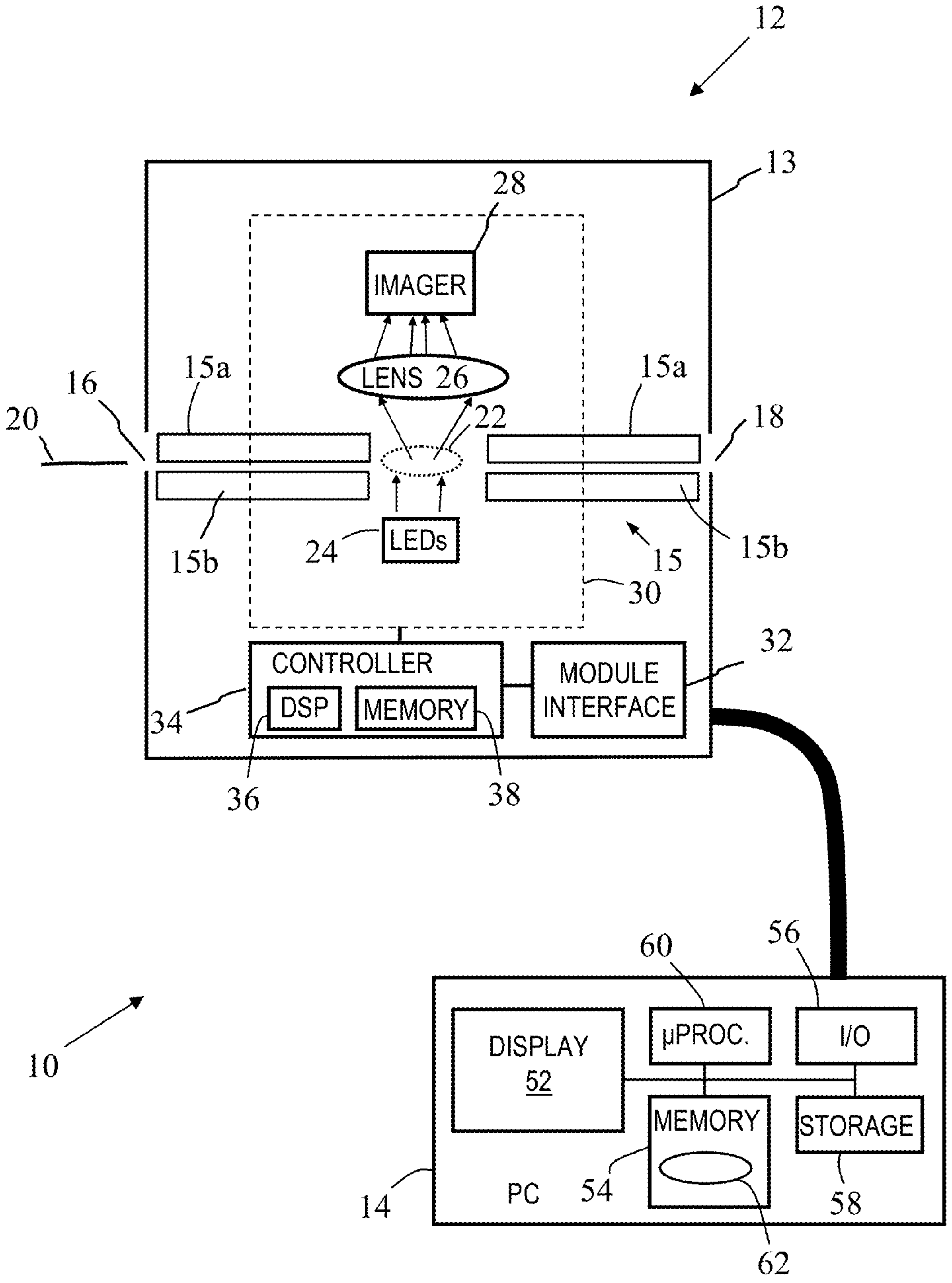
FIG. 1 is a schematic diagram of a stain detecting system comprising a media validator coupled to a personal computer (PC), where the system is suitable for implementing a method of detecting staining on a media item according to one embodiment of the present invention.

Reference is first made to FIG. 1, which is a simplified schematic diagram of a stain detection system 10 comprising a media item validator 12 (in the form of a banknote validator)

coupled to a personal computer (PC) 14 for implementing a method of detecting staining on a media item according to one embodiment of the present invention.

The banknote validator 12 comprises a housing 13 supporting a transport mechanism 15 in the form a train of pinch rollers comprising upper pinch rollers 15*a* aligned with lower pinch rollers 15*b*, extending from an entrance port 16 to a capture port 18.

The entrance and capture ports 16,18 are in the form of apertures defined by the housing 13.

In use, the pinch rollers 15*a,b* guide a media item (in this embodiment a banknote) 20 short edge first through an examination area 22 defined by a gap between adjacent pinch roller pairs. While the banknote 20 is being conveyed through the examination area 22, the banknote 20 is illuminated selectively by illumination sources, including a lower linear array of infra-red LEDs 24 arranged to illuminate across the long edge of the banknote 20. The infra-red LEDs 24 are used for transmission measurements. Additional illumination sources are provided for other functions of the banknote validator 12 (for example, banknote identification, counterfeit detection, and the like), but these are not relevant to this invention, so will not be described herein.

When the infra-red LEDs 24 are illuminated, the emitted infra-red radiation is incident on an underside of the banknote 20, and an optical lens 26 focuses light transmitted through the banknote 20 to the optical imager 28 (in this embodiment a CCD contact image sensor (CIS)). This provides a transmitted infra-red channel output from the optical imager 28. In this embodiment, the optical imager 28 comprises an array of elements, each element providing an eight bit value of detected intensity. The CIS 28 in this embodiment is a 200 dots per inch sensor but the outputs are averaged so that 25 dots per inch are provided.

The illumination source 24, lens 26, and imager 28 comprise an image collection component 30.

The banknote validator 12 includes a data and power interface 32 for allowing the banknote validator 12 to transfer data to an external unit, such as an ATM (not shown) a media depository (not shown), or the PC 14, and to receive data, commands, and power therefrom.

The banknote validator 12 also has a controller 34 including a digital signal processor (DSP) 36 and an associated memory 38. The controller 34 controls the pinch rollers 15 and the image collection component 30 (including energizing and de-energizing the illuminating source 24). The controller 34 also collates and processes data captured by the image collection component 30, and communicates this data and/or results of any analysis of this data to the external unit via the data and power interface 32. The controller 34 receives the infra-red transmission data from the optical imager 28.

The banknote validator 12 can be coupled to (and also decoupled from) the PC 14, as shown in FIG. 1. Although in some embodiments, a PC would not be needed (the banknote validator 12 performing all of the processing and data storage required), in this embodiment the PC 14 is used when binary reference images are to be created because the PC 14 has better data processing and storage than the banknote validator 12. The banknote validator 12 may be coupled to the PC 14 directly, as shown in FIG. 1, or indirectly (via a network or an external unit (for example, an ATM)).

The PC 14 is a conventional type of PC comprising a display 52, memory 54 (in the form of SDRAM), input/output communications 56 (supporting USB standards (for connection of a keyboard, mouse, and the like), Ethernet, and the like), storage 58 (in the form of a hard drive), and a processor (or processors) 60. In addition, the PC 14 executes a conventional operating system (not shown) and a non-stain template creation program 62.

The non-stain template creation program 62 receives data (in the form of captured images of media items) from the banknote validator 12 and processes the data to create non-stain templates (also referred to as binary reference images). These non-stain templates (binary reference images) can then be transferred back to the banknote validator 12 for use in ascertaining if subsequently entered media items are stained or not.

Operation of the Stain Detection System

The stain detection system 10 can operate in two modes.

The first mode is referred to as data collection mode. In data collection mode multiple media items (in this embodiment banknotes) of the same type are fed into the banknote validator 12. The banknote validator 12 captures images of these banknotes and transfers the images to the PC 14 to allow the PC 14 to create a non-stain template (also referred to as a binary reference image) for that type and orientation of media item. A typical banknote non-stain template may be produced from, for example, a hundred unstained samples; that is, a hundred different banknotes of the same type, series, and orientation (each without any staining) may be inserted into the banknote validator 12 to create the non-stain template. The higher the number of samples used, the more statistically average the non-stain template will be for that type, series, and orientation of banknote.

The second mode the stain detection system 10 can operate in is referred to as stain detection mode. In stain detection mode, the banknote validator 12 can be used independently of the PC 14. When operating in stain detection mode, the banknote validator 12 is typically located in a media depository (not shown) in an ATM (not shown) or in another automated media validation machine.

In stain detection mode, a single banknote is fed into the banknote validator 12. The banknote validator 12 captures an image of the banknote and creates a binary image therefrom. The banknote validator 12 then accesses a recognition template to identify the banknote (currency and/or denomination). The banknote validator 12 then accesses a corresponding non-stain template that was previously created and is stored locally in the banknote validator 12 and compares the created binary image of the banknote with the accessed non-stain template to ascertain if the banknote is stained beyond an acceptable amount.

Both of these modes of operation will be described in more detail below.

It should be appreciated that this banknote validator 12 also includes software (coded into the DSP) for (i) identifying the inserted banknote (that is, the particular currency, denomination, series, etc. of the banknote) prior to testing for whether the banknote is stained; and (ii) validating the banknote once it has been identified and deemed not to be stained beyond an acceptable amount. Such banknote validation software is known and will not be described in detail herein. The banknote validation software may include templates for validating media items, but these validation templates are different to the non-stain templates that are described herein. Suitable software and hardware for media validation (including banknote validation) is available from NCR Corporation, 3097 Satellite Blvd., Duluth, Ga. 30096, U.S.A., which is the assignee of the present application.

Data Collection Mode for Non-Stain Template Creation

Figure 2A:
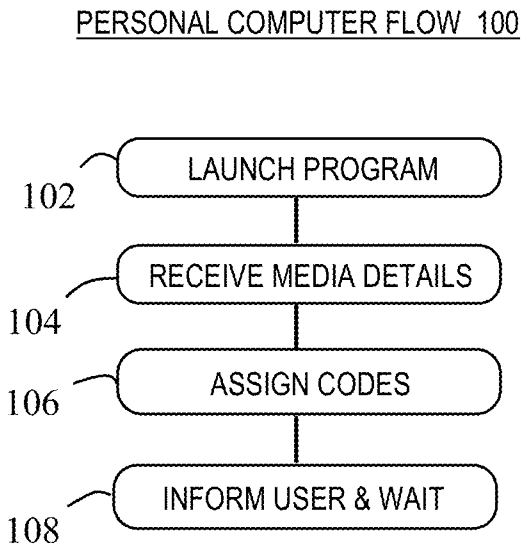
FIGS. 2*a* to 2*c* are flowcharts illustrating steps in capturing and processing images for a specific type and orientation of media item inserted into the media validator of FIG. 1 to create a non-stain template for use in detecting staining on a media item.
Figure 2B:
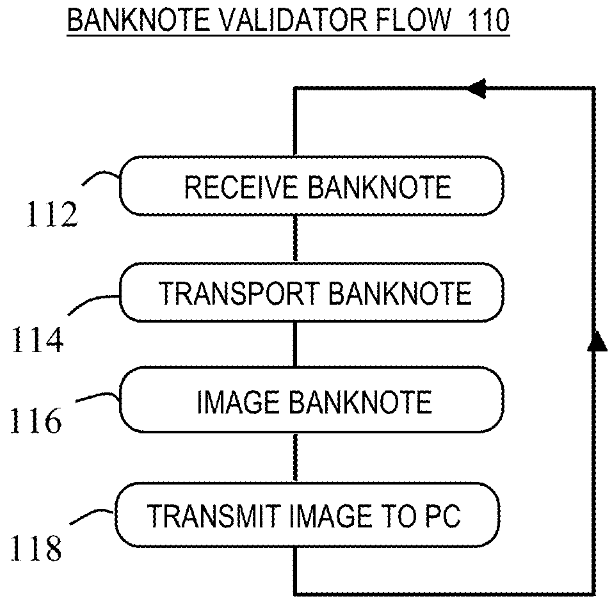
Figure 2C:
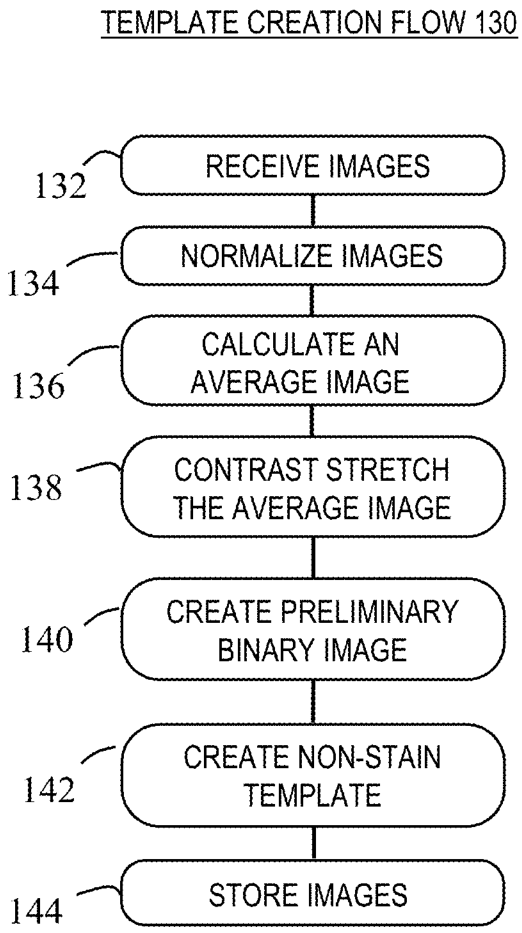

The operation of the stain detection system 10 will now be described with reference to FIGS. 2*a* to 2*d*, which are flowcharts illustrating the steps involved in creating a non-stain template for a specific type and orientation of banknote 20. FIG. 2*a* illustrates the steps implemented by the PC 14. FIG. 2*b* illustrates the steps implemented by the banknote validator 12 in data collection mode, and FIGS. 2*c* and 2*d* illustrate steps implemented by the PC 14 in response to data received from the banknote validator 12.

Referring first to FIG. 2*a*, the first step is for the user to launch the non-stain template creation program 62 (hereinafter "template program") 62 on the PC 14 (step 102). This template program 62 presents a graphical user interface on the display 52 inviting the user to enter information about the media items that will be inserted into the banknote validator 12 (step 104). The information may be selectable from drop down menus, but includes the ability for a user to enter new information. In this embodiment such information includes the currency (for example, U.S. dollars, U.K. pounds, Euros, and the like), the denomination (for example, 10, 20, 50, 100, 200, 500, 1000, and the like), the series (for example, 1993 to 1996, 1996 to 2003, or the like), the number of media items in the sample (for example, ten, twenty, fifty, a hundred, a thousand, or the like), and the like. The combination of the currency, denomination, and series comprises the class of the media item. One non-stain template will be created for each class of media item that the banknote validator 12 is to receive.

Once a user has entered the information then the template program 62 converts the entered information into predetermined codes (step 106). For example, U.S. dollars may have the code "USD", a twenty dollar bill may have the code "20", and the like. In this example the user will insert fifty, one hundred Euro bills (€ 100) in the face-up left edge (FULE) short edge first orientation.

The PC 14 then informs the user, via the display 52, to begin inserting the banknotes 20, and awaits data transfer from the banknote validator 12 (step 108).

Referring now to FIG. 2*b*, which shows the flow 110 occurring at the banknote validator 12, the first step is for the user to insert the first banknote 20 in a first orientation (in this embodiment face-up left edge), which the banknote validator 12 receives (step 112).

The controller 34 then transports the banknote 20 to the examination area 22 (step 114) and causes the image collection component 30 to capture an image of the banknote 20 (IR transmitted) (step 116).

It should be appreciated that the image capture process may be used for multiple different purposes. For example, the banknotes inserted for use in creating a non-stain template may also be used to create an identification template and/or a validation template. Thus, additional channels (that is, additional to the IR transmitted channel) of information may be captured at this point. In other words, the banknote validator 12 may include other light sources (for example, a green light source), not shown in FIG. 1 for clarity. However, these other templates (identification and validation) are not essential to an understanding of this invention, so they will not be described in detail herein. It is sufficient for the skilled person to realize that the same banknote validator may be used to create multiple different templates for each set of banknotes inserted.

Returning to FIG. 2*b*, the image collection component 30 transmits the captured images to the controller 34, which transmits the captured images to the PC 14 for processing (step 118).

The process then reverts to step 112, at which the user inserts another € 100 banknote.

Processing of the captured images at the PC 14 to create a non-stain template will now be described with reference to FIG. 2*c*. FIG. 2*c* is a flowchart illustrating the non-stain template creation flow 130 at the PC 14. The non-stain template creation flow 130 comprises the steps performed by the PC 14 on the images transmitted from the banknote validator 12.

The PC 14 receives the images for individual banknotes 20 from the banknote validator 12 (step 132) as they are imaged. Thus, even though the banknote validator 12 will image fifty banknotes 20 for the non-stain template, the banknote validator 12 conveys images for each banknote 20 as soon as the images are captured.

Once all of the images have been received by the PC 14, the images are normalized (deskewed then aligned) and adjusted (cropped or added to) (step 134). Deskewing (including edge and/or corner detection), alignment, and adjustment of captured images can be implemented by techniques that are known to those of skill in the art. See, for example, United States patent application number 20090324053, which is also in the name of the assignee of the present application.

As a result of the alignment and adjustment step, (i) each image in the set of images contains the same number of pixels as each of the other images in the set, and (ii) pixels on one image that relate to a feature on the banknote (for example, the number "2") are located at the same spatial position as the pixels on every other image in the set that relate to that feature.

In this embodiment, each image comprises a two-dimensional array of approximately 80 pixels by 145 pixels. Each pixel in this array has an intensity value representing the intensity of IR light transmitted through the banknote 20 at that spatial location. Thus, each pixel in an image represents a spatial location on the banknote corresponding to (and in registration with) the x and y location of the pixel in the two-dimensional array.

Figures 3A, 3B, 3C, 3D:
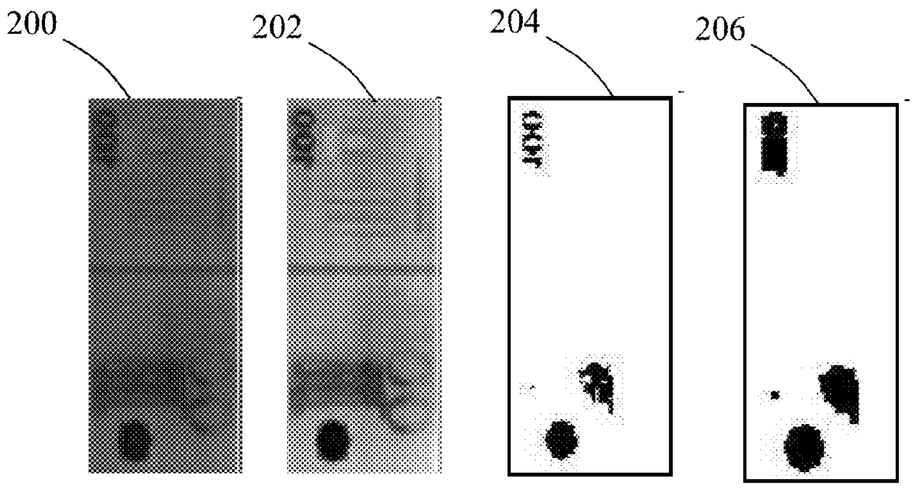
FIGS. 3*a* to 3*d* are pictorial diagrams that illustrate images created at different steps of the non-stain template creation process described in FIGS. 2*a* to 2*c;*

The PC 14 then averages all of the images in the set of images on a pixel by pixel basis (step 136) to create an average image. This is implemented by (i) identifying a pixel location, (ii) averaging the pixel intensity values for this pixel location from all of the images in the image set, (iii) using that average pixel intensity value for that pixel location in the average image, and (iv) repeating steps (i) to (iii) until all of the pixel locations have been created in the average image. A pictorial representation of an average image 200 is shown in FIG. 3*a*, which illustrates an image created by averaging the fifty € 100 banknotes inserted into the banknote validator 12. The pictorial representation of FIG. 3*a* was created by transforming the two-dimensional array of numerical pixel intensities from the average image into pixels having shades of grey based on the pixel intensities in that average image.

The PC 14 then applies contrast stretching to the average image (step 138) to expand a central portion of the range of pixel intensity values in the average image. Contrast stretching is a known technique.

In this embodiment, a five percent (5%) saturation is applied to both the low and high intensity values. This means that all of the pixels in the average image are arranged in a linear group in order of pixel intensity (that is, in a one-dimensional array) and the pixel intensity of the pixel at 5% along the linear group is ascertained. This pixel intensity is then used as a lower limit, such that those pixels in the average image having an intensity value less than or equal to this 5% lower limit are all assigned an intensity of "0". Similarly, the pixel intensity of the pixel at 95% along the linear group is ascertained. This pixel intensity is then used as an upper limit, such that those pixels in the average image having an intensity value greater than or equal to this 95% upper limit are all assigned an intensity of "255" (the highest possible value with eight bit intensity values). Those pixels in the central portion (having an intensity between the lower limit and the upper limit) have their intensities scaled so that the intensities of pixels in the central portion now range from “1” to “254”. It should be understood that “central portion” relates to pixel intensities, not spatial locations.

Contrast stretching improves image contrast (by expanding the central portion of the range of intensity values to cover the entire range available) and reduces the effects of holes and other defects in the banknote. A pictorial representation of the contrast stretched average image 202 is shown in FIG. 3*b*.

The PC 14 then creates a preliminary binary reference image from the contrast stretched image (step 140). This is implemented by applying a threshold to each pixel in the contrast stretched image to transform each pixel to a binary value. Thus, a binary reference image is created that comprises a plurality of pixels, each having either a high intensity (binary “1”) or a low intensity (binary “0”).

In this embodiment, the threshold applied is 10% of the dark pixels (provided that this includes at least all of the pixels that have been assigned an intensity of “0”). This means that when all of the pixels in the contrast stretched image are arranged in order of pixel intensity, (i) the lowest ten percent of pixels (by pixel intensity) are all assigned to low intensity (binary “0”); and (ii) the highest ninety percent of pixels (by pixel intensity) are all assigned high intensity (binary “1”). A pictorial representation of the preliminary binary reference image 204 is shown in FIG. 3*c*, in which binary “0” pixels are shown as black and binary “1” pixels are shown as white.

The PC 14 then creates a non-stain template (step 142) by applying a neighborhood based minimum filter to the preliminary binary reference image to create a final binary reference image.

In this embodiment, the step of applying a neighborhood based minimum filter involves preparing a matrix having the desired dimensions (which are the same dimensions as those of the images in the image set because all of the images have been normalized—see step 134 above). In this embodiment, the desired dimensions are approximately 80 pixels by 145 pixels.

The value of each pixel location in the matrix is set as the lowest intensity value in the N×N neighborhood (in this embodiment 3×3 neighborhood) of the corresponding identical pixel location in the preliminary binary reference image by the template program 62. As a result, if there exists a low intensity (binary “0”) in the 3×3 neighborhood of a pixel location in the preliminary binary reference image, the same pixel location in the final binary reference image (the matrix) will be set to binary “0”. This has the effect of enlarging the dark (low intensity) areas in each 3×3 array in both the horizontal and vertical directions (unless all pixels in that array are already low intensity). This reduces the effects of any errors introduced by printing on the banknote, and the like. A pictorial representation of the non-stain template 206 (the final binary reference image) is shown in FIG. 3*d*.

Once the non-stain template 206 has been created, it is stored in the PC 14, and also transferred to local storage (for example, memory 38) in the banknote validator 12 (step 144). Associated information (in addition to the binary values that comprise the pixel values in the non-stain template) is also stored as part of the non-stain template 206. This associated information includes pixel intensity information (that is, the pixel intensities prior to applying the threshold) for use as a linearization threshold, as will be described in more detail below in stain detection mode.

Once all required non-stain templates have been created and stored (in this embodiment, one non-stain template for each denomination to be validated by the banknote validator 12), the banknote validator 12 can be operated in stain detection mode, as will now be described with reference to FIG. 4, which shows the flow 400 of steps performed by the banknote validator 12 in stain detection mode. When operating in stain detection mode, the banknote validator 12 does not need to be (and in practical embodiments would typically not be) coupled to the PC 14.

Stain Detection Mode

Figure 4:
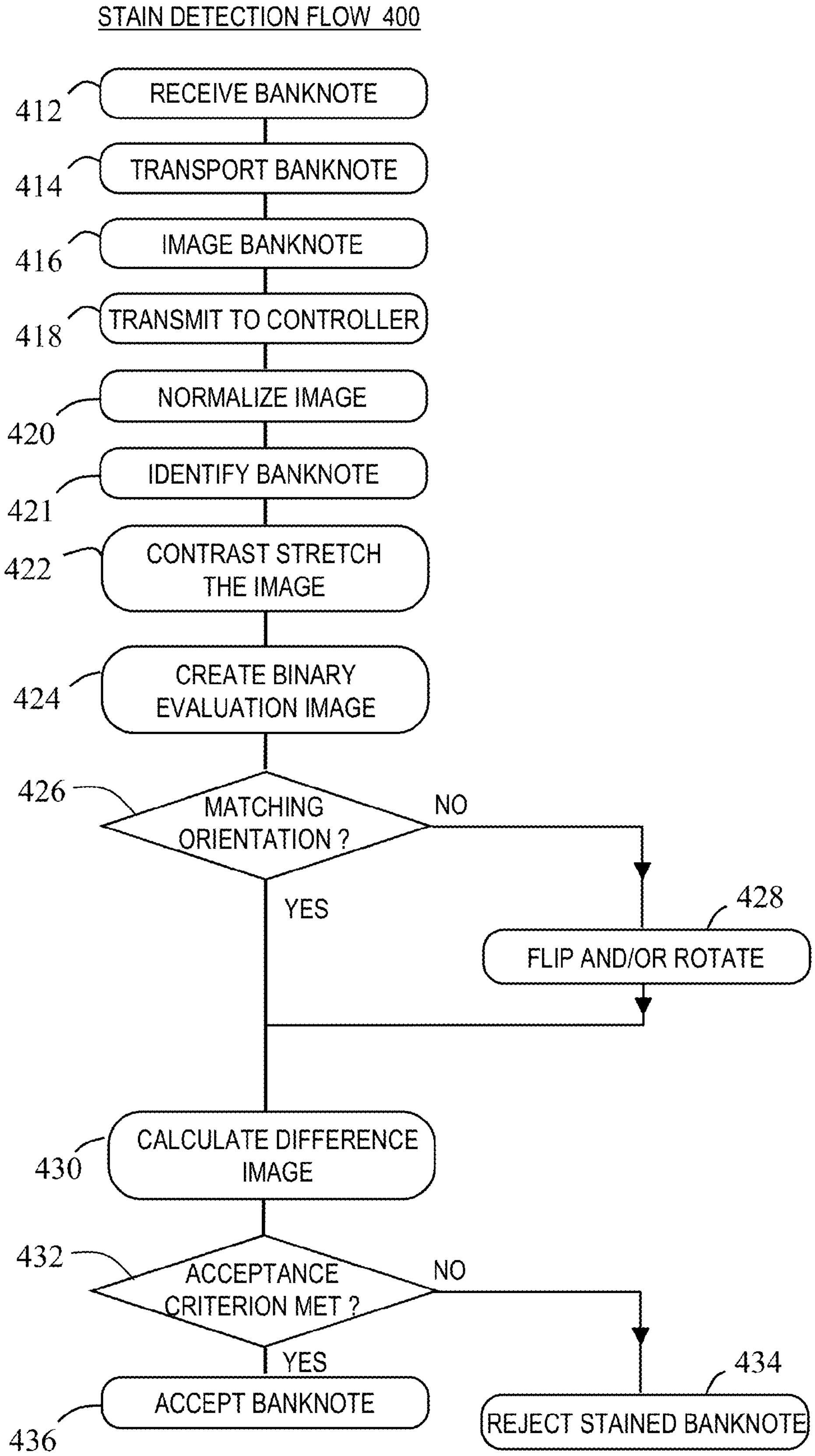
FIG. 4 is a flowchart illustrating steps in detecting staining of a media item inserted into the media validation module of FIG. 1 using a non-stain template created by the template creation process of FIGS. 2*a* to 2*c*.

Referring now to FIG. 4, in stain detection mode, the user inserts a banknote 20 in any of the four possible short edge first orientations (in this example face down left edge (FDLE)), which the banknote validator 12 receives (step 412).

Figures 5A, 5B, 5C, 5D, 5E, 5F:
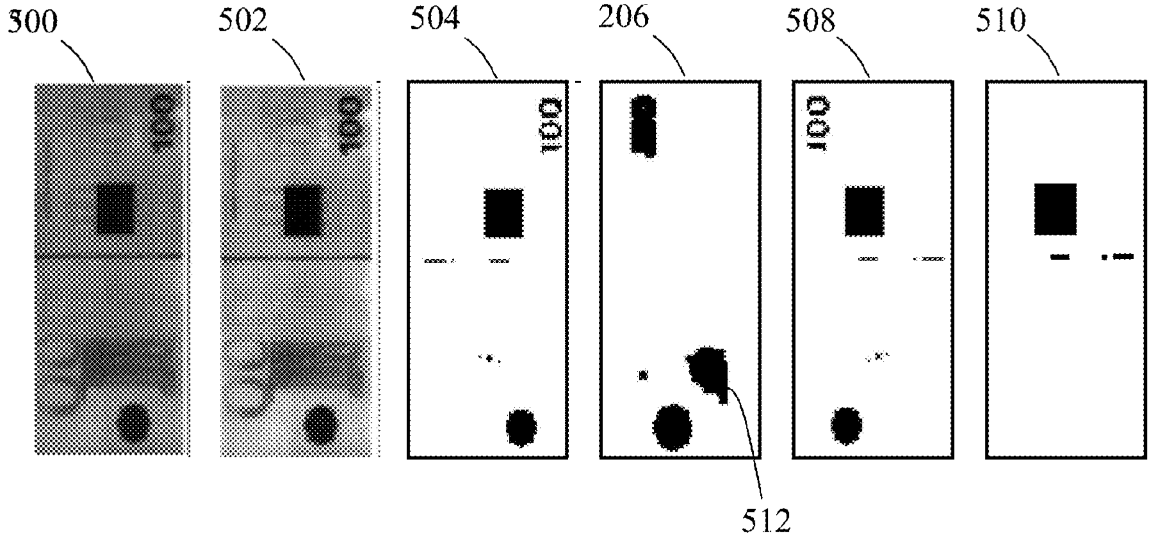
FIGS. 5*a* to 5*f* are pictorial diagrams that illustrate images created at different steps of the stain detection process described in FIG. 4.

The controller 34 then transports the received banknote 20 to the examination area 22 (step 414) and causes the image collection component 30 to capture an image of the banknote (IR transmitted) (step 416), together with any other images required for other processes (for example, recognition and validation). A pictorial representation of the captured IR image 500 is shown in FIG. 5*a*.

The image collection component 30 transmits the captured IR transmission image to the controller 34 (step 418).

The controller 34 includes the same functionality as provided by the non-stain template creation program 62 (in the PC 14), so that the controller 34 normalizes the received image (step 420) in a very similar manner to that described with reference to FIG. 2*c* (see step 134).

In practical embodiments, stain detection would be conducted in parallel with banknote identification, banknote validation, and optionally banknote quality evaluation, but these other processes are known so they will not be described herein.

The controller 34 then recognizes the banknote (step 421) so that at least the currency and denomination is known (where only one currency is received, only the denomination needs to be identified). This banknote identification (recognition) process may be performed using the normalized image, but in this embodiment it is performed using a separate image captured by an illumination source not described herein. Suitable techniques for identifying banknotes using a system similar to the apparatus of FIG. 1 are described in United States patent application number 20090324053, which is also in the name of the assignee of the present application.

The controller 34 then applies contrast stretching to the normalized image (step 422) using a 5% saturation at both low and high pixel intensity values (the 5% values being taken from the average image created in step 136, which are provided as part of the associated information that is stored in (or with) the non-stain template 206). This is the same process that was performed at step 138 (FIG. 2*c*). A pictorial representation of the contrast stretched image 502 is shown in FIG. 5*b*.

The controller 34 then creates a binary evaluation image from the contrast stretched image (step 424) (using the process described in step 140). This is implemented by applying a threshold to each pixel in the contrast stretched image to transform each pixel to a binary value. Thus, a binary evaluation image is created that comprises a plurality of pixels, each having either a high intensity (binary “1”) or a low intensity (binary “0”).

In this embodiment, the threshold applied is 10% of the dark pixels from the contrast stretched average image 202 (that is, the image depicted in FIG. 3*b*). This is provided as part of the associated information that is stored in (or with) the non-stain template 206. A pictorial representation of the binary evaluation image 504 is shown in FIG. 5*c*.

The controller 34 then compares an orientation of the binary evaluation image 504 with an orientation of the non-stain template 206 (shown in FIGS. 3*d* and 5*d*) (step 426).

If the orientations do not match then the binary evaluation image 504 needs to be rotated and/or flipped, as necessary (step 428). In this example, the non-stain template 206 was created from banknotes fed in using a face-up left edge (FULE) orientation; whereas, the banknote being evaluated was inserted in face down left edge (FDLE) orientation, so the binary evaluation image 504 needs to be flipped. A pictorial representation of the flipped binary evaluation image 508 is shown in FIG. 5*e*.

This reorientation step has the advantage that only one non-stain template is needed for each denomination series (rather than four non-stain templates, one for each possible banknote insertion orientation). This enables the banknote to be processed regardless of which of the four possible orientations were used to insert the banknote.

If the orientations do match (or once the non-matching orientation has been correctly oriented using a geometric transformation), the process proceeds to step 430, at which the controller 34 calculates a difference image between the non-stain template 206 and the (re-oriented if necessary) binary evaluation image 508 (step 430). A pictorial representation of the difference image 510 is shown in FIG. 5*f*.

This difference image 510 is calculated by comparing a pixel in the (flipped) binary evaluation image 508 with a pixel in the non-stain template 206 at a corresponding spatial location.

In this embodiment, the difference image 510 is populated with a high intensity (non-stain) pixel (binary "1") at each location where the (flipped) binary evaluation image 508 has a high intensity pixel.

Each low intensity pixel in the binary evaluation image 508 is compared with the corresponding pixel in the non-stain template 206. If the non-stain template 206 has a low intensity pixel at that location then the difference image 510 is populated with a high intensity (non-stain) pixel (binary "1"). If the non-stain template 206 has a high intensity pixel at that location then the difference image 510 is populated with a low intensity (stain) pixel (binary "0"). In other words, only the low intensity pixels from the binary evaluation image 508 are compared with the corresponding pixels from the non-stain template 206 (the high intensity pixels are all transferred to the difference image 510). Only if the binary evaluation image 508 has a low intensity pixel where the non-stain template 206 has a high intensity pixel is the corresponding pixel location in the difference image 510 populated with a low intensity pixel.

In other embodiments, the difference image may be calculated using a Boolean NAND function on every pair of pixels (that is, a pixel from the binary evaluation image 508 and the corresponding pixel from the non-stain template 206). One input to the NAND function is the binary evaluation image pixel values (inverted). The other input to the NAND function is the non-stain template pixel values (not inverted). The output from the NAND function is only binary "0" (low intensity) if a pixel from the binary evaluation image 508 is binary "0" (low intensity) and the corresponding pixel from the non-stain template 206 is binary "1" (high intensity). In other words, the difference image 510 includes a stain pixel at each spatial location in which a pixel in the binary evaluation image 508 has a low intensity pixel and the corresponding pixel in the non-stain template 206 has a high intensity pixel. The difference image 510 also includes a non-stain pixel at each spatial location in which a pixel in the binary evaluation image 508 has either (a) a low intensity pixel and the corresponding pixel in the non-stain template 206 has a low intensity pixel, or (b) a high intensity pixel.

As shown in FIG. 5*f*, each high intensity (binary "1") pixel (also referred to as a non-stain pixel) in the difference image 510 is illustrated by a white area, and each low intensity (binary "0") pixel (also referred to as a stain pixel) is illustrated by a black area in the image of the banknote 20. However, the opposite convention could be used.

It should be noted that the non-stain template 206 includes a dark area 512 (FIG. 5*d*) that does not appear on the binary evaluation image 508. This dark area 512 does not appear on the difference image 510 because the binary evaluation image 508 does not have this dark area.

The controller 34 then ascertains if the banknote fulfils a staining criterion (step 432).

In this embodiment, the staining criterion comprises the condition that no low intensity area exceeds a maximum allowable stain size. In this embodiment, if an area of 9 mm by 9 mm includes only stain pixels (black areas in FIG. 5*f*) then the banknote is rejected as stained (step 434). The banknote may be captured by a device in which the banknote validator 12 is located, or returned to the customer, depending on preferences set by the owner and/or operator of the banknote validator 12.

If there is no low intensity area that exceeds the maximum stain size (9 mm by 9 mm in this embodiment) then the banknote 20 is accepted as not stained (step 436). However, the banknote may be rejected as a counterfeit, or for some other reason (for example, poor quality), as a result of additional processing that may be part of the banknote validator's other functions.

It should now be appreciated that the above embodiment has significant advantages. For example, it provides a reliable method for detecting staining on a media item. It is also flexible in that the area of staining required for a media item to be rejected as stained can be easily updated (enlarged or reduced). It only requires one light source (infra-red transmission). Only one orientation is required, regardless of which of the four possible orientations is used to insert the media item. The processing and memory requirements are relatively small, and the process is quick (typically of the order of a few tens of milliseconds) both for generating the non-stain template and for testing an inserted media item.

Various modifications may be made to the above described embodiment within the scope of the invention, for example, in other embodiments the illumination source 24 may comprise additional light sources, such as an upper and a lower green LED source, so that the banknote validator can perform additional functions.

In other embodiments, the stain detection system 10 may not include the PC 14. In such embodiments, the steps of the non-stain template creation flow 130 may be implemented by the banknote validator 12. However, using a PC 14 has the advantages of high capacity storage, high processing performance, and an easy to use user interface.

In other embodiments, different media items may be used (for example, checks) and media items may be inserted long edge first, or otherwise presented (for example, placed in a hopper or pocket).

In other embodiments, a different staining criterion may be applied.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

What is claimed is:

1. A method of detecting staining on a media item, the method comprising:

receiving an image of the media item, where the image comprises a plurality of pixels having different intensity values within a range of intensity values;

using pixels from the image having intensity values within a central portion of the range of intensity values to create a centrally-weighted image;

applying a threshold to each pixel in the centrally-weighted image to transform each pixel to a binary value thereby creating an evaluation image comprising a plurality of pixels, each having one of two possible values;

calculating a difference image between a binary reference image and the evaluation image by comparing a pixel in the evaluation image with a pixel in the binary reference image at a corresponding spatial location, so that the difference image includes (i) a stain pixel at each spatial location in which a pixel in the evaluation image has a low intensity pixel and the corresponding pixel in the binary reference image has a high intensity pixel, and (ii) a non-stain pixel at all other spatial locations;

indicating that the media item is stained in the event that the difference image meets a staining criterion.

2. A method according to claim 1, wherein the staining criterion comprises the difference image not including stain pixels covering a maximum stain area.

3. A method according to claim 1, wherein the method comprises the additional step of capturing an image of the media item prior to the step of receiving an image of the media item.

4. A method according to claim 3, wherein the step of capturing an image of the media item further comprises capturing a transmission image of the media item using an infra-red radiation transmitter on one side of the media item and an infra-red radiation detector on the opposite side of the media item.

5. A method according to claim 1, wherein the step of using pixels from the image having intensity values within a central portion of the range of intensity values to create a centrally-weighted image comprises contrast stretching the received image to expand a central portion of the range of intensity values so that the centrally-weighted image comprises a contrast stretched image.

6. A method according to claim 5, wherein the step of applying a threshold to each pixel in the centrally-weighted image further comprises: ascertaining from a reference image from which the binary reference image was created (i) a threshold pixel intensity at which Y percent of all of the pixels in the reference image have a pixel intensity below the threshold pixel intensity, (ii) assigning a first binary value to each pixel in the centrally-weighted image having a pixel intensity below or equal to the threshold pixel intensity, and (iii) assigning a second binary value to each pixel in the centrally-weighted image having a pixel intensity above the threshold pixel intensity.

7. A method according to claim 1, wherein prior to calculating a difference image, the method comprises the further steps of (i) comparing an orientation of the evaluation image with an orientation of the binary reference image, and (ii) where the orientations do not match, implementing a geometric transformation of the evaluation image to match the orientation of the binary reference image.

8. A media validator operable to detect staining on a media item presented thereto, the media validator comprising:

a media item transport for transporting a media item;

an image capture device aligned with the media item transport and for capturing a two-dimensional array of pixels corresponding to the media item, each pixel having a pixel intensity relating to a property of the media item at a spatial location on the media item corresponding to that pixel; and a processor programmed to control the media transport and the image capture device, and also programmed to: (i) receive the two-dimensional array of pixels; (ii) centrally-weight the received two-dimensional array of pixels; (iii) apply a threshold to each pixel in the centrally-weighted array of pixels to transform each pixel to a binary value thereby creating an evaluation image comprising a plurality of pixels, each having one of two possible values; (iv) calculate a difference image between a binary reference image and the evaluation image by comparing a pixel in the evaluation image with a pixel in the binary reference image at a corresponding spatial location, so that the difference image includes (a) a stain pixel at each spatial location in which a pixel in the evaluation image has a low intensity pixel and the corresponding pixel in the binary reference image has a high intensity pixel, and (b) a non-stain pixel at all other spatial locations; and (v) indicate that the media item is stained in the event that the difference image meets a staining criterion.

9. A media validator according to claim 8, wherein the media item transport comprises one or more endless belts.

10. A media validator according to claim 8, wherein the image capture device comprises a two dimensional sensor having a sensor area at least as large as the media item area.

11. A media validator according to claim 8, wherein the image capture device further comprises an infra-red illumination source located on an opposite side of a media item path to an infra-red detector.

12. A media validator according to claim 8, wherein the media validator comprises a banknote validator.

13. A media depository comprising a media validator according to claim 8.

14. A media depository according to claim 13, wherein the media depository includes a banknote storage area and a check storage area.

* * * * *